United States Patent
Charleston

(10) Patent No.: US 9,565,832 B2
(45) Date of Patent: Feb. 14, 2017

(54) PIVOTAL COVER ASSEMBLY FOR A POULTRY DRINKER

(71) Applicant: Don Charleston, Maxwell, IA (US)

(72) Inventor: Don Charleston, Maxwell, IA (US)

( * ) Notice: Subject to any disclaimer, the term of this patent is extended or adjusted under 35 U.S.C. 154(b) by 107 days.

(21) Appl. No.: 14/244,333

(22) Filed: Apr. 3, 2014

(65) Prior Publication Data
US 2014/0299064 A1 Oct. 9, 2014

Related U.S. Application Data

(60) Provisional application No. 61/807,863, filed on Apr. 3, 2013.

(51) Int. Cl.
*A01K 7/00* (2006.01)
*A01K 7/02* (2006.01)
*A01K 39/026* (2006.01)

(52) U.S. Cl.
CPC .............. *A01K 7/02* (2013.01); *A01K 39/026* (2013.01)

(58) Field of Classification Search
CPC ... A01K 39/02; A01K 39/026; A01K 39/0113
USPC ................. 119/52.3, 52.4, 61.3, 72
See application file for complete search history.

(56) References Cited

U.S. PATENT DOCUMENTS

| | | | | |
|---|---|---|---|---|
| 1,785,782 A * | 12/1930 | Markey | ................ | A01K 39/012 119/53.5 |
| 1,917,371 A * | 7/1933 | Hill | ................ | A01K 39/02 119/52.1 |
| 1,983,613 A * | 12/1934 | Keating | ................ | A01K 39/026 119/72 |
| 3,090,354 A * | 5/1963 | Merritt | ................ | A01K 39/0113 119/52.3 |
| 4,102,308 A * | 7/1978 | Kilham | ................ | A01K 39/0113 119/52.3 |
| 4,207,839 A * | 6/1980 | Barry | ................ | A01K 39/0113 119/57.9 |
| 4,348,988 A | 9/1982 | Lawson | | |
| 4,821,681 A * | 4/1989 | Tucker | ................ | A01K 39/0113 119/51.01 |
| 5,097,797 A | 3/1992 | Van Zee et al. | | |
| 5,829,386 A | 11/1998 | Wenstrand | | |
| 5,927,232 A | 7/1999 | Pollock | | |
| 6,155,205 A * | 12/2000 | Coates | ................ | A01K 39/014 119/52.3 |
| 6,918,353 B1 * | 7/2005 | Coroneos | ........... | A01K 39/0113 119/52.3 |
| 8,006,642 B2 * | 8/2011 | Vosbikian | ............ | A01K 39/012 119/52.2 |

FOREIGN PATENT DOCUMENTS

GB      2453386 A * 4/2009  ......... A01K 39/0113

* cited by examiner

*Primary Examiner* — Danielle Clerkley
(74) *Attorney, Agent, or Firm* — Zarley Law Firm, P.L.C.

(57) ABSTRACT

A pivotal cover assembly for a poultry drinker includes a sleeve that fits over the top of a drinker. Connected to the sleeve and extending upwardly from the drinker is a primary support. Pivotally connected to the primary support, in spaced relation to the drinker, is a cover member.

5 Claims, 3 Drawing Sheets

PIVOTAL COVER ASSEMBLY FOR A POULTRY DRINKER

CROSS REFERENCE TO RELATED APPLICATION

This application claims the benefit of U.S. Provisional Application No. 61/807,863 filed Apr. 3, 2013.

BACKGROUND OF THE INVENTION

This invention is directed to a cover for a poultry drinking device or fount and more particularly a cover for a poultry drinking device that pivots or is tiltable.

Poultry drinkers or founts are well known. Presently, birds tend to roost on the top edge of the drinkers. As a result, because a drinking pan is positioned below and extends outwardly from the top edge, birds have a tendency to leave droppings in the drinking water. Not only is this unsanitary, but as a result cleaning the drinking device is more difficult and is required more frequently. Accordingly there exists a need to address these issues.

Therefore, an objective of the present invention is to provide a cover for a drinker that discourages birds from roosting on the drinker.

A further objective is to provide a cover for a drinking device that reduces the amount of droppings deposited in the drinking water.

These and other objectives will be apparent based upon the following written description.

SUMMARY OF THE INVENTION

A pivotal cover assembly for a poultry drinker includes a sleeve that fits over the top of a drinker. Connected to the sleeve and extending upwardly from the drinker is a primary support. Pivotally connected to the primary support, in spaced relation to the drinker, is a cover member.

DETAILED DESCRIPTION OF THE PREFERRED EMBODIMENTS

Figure 1:
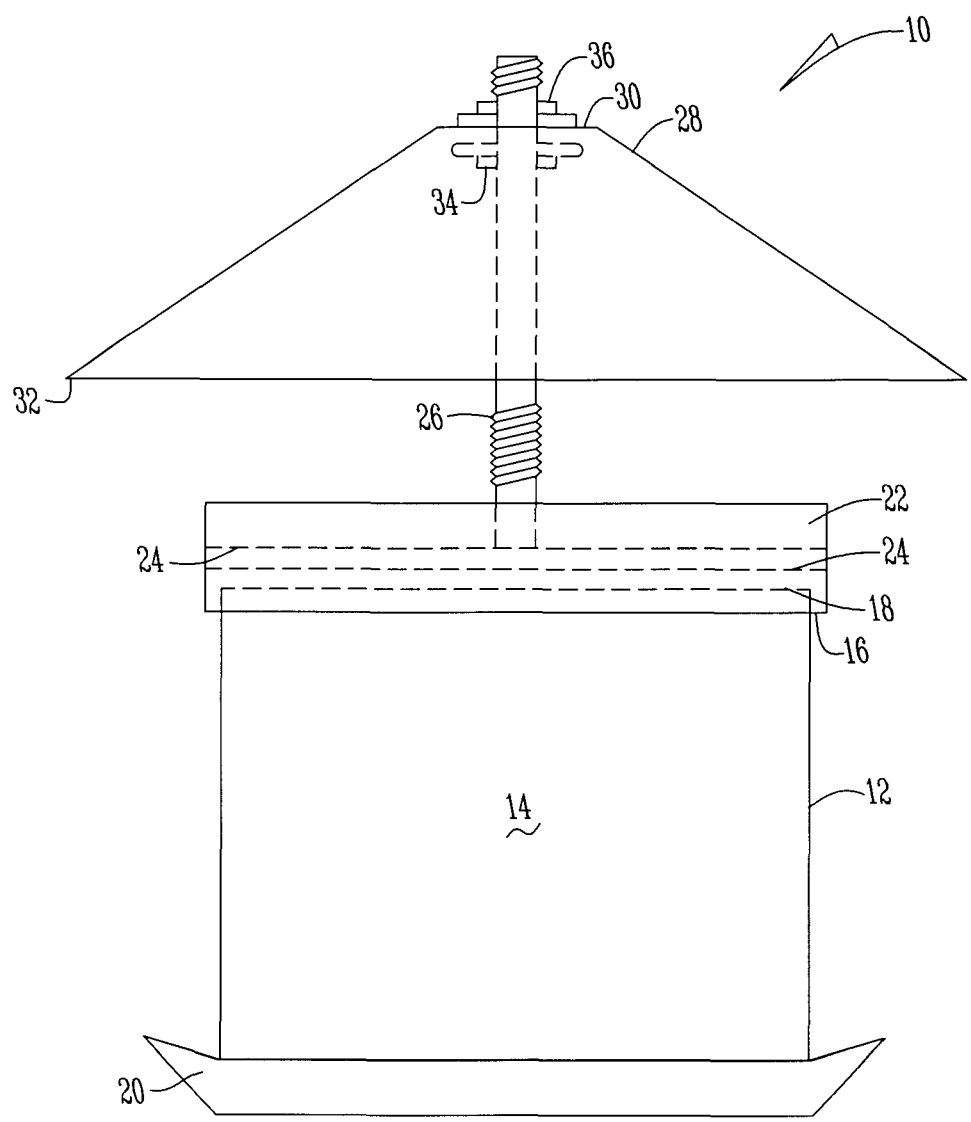
FIG. 1 is a side sectional view of a cover assembly and a drinker.
Figure 2:
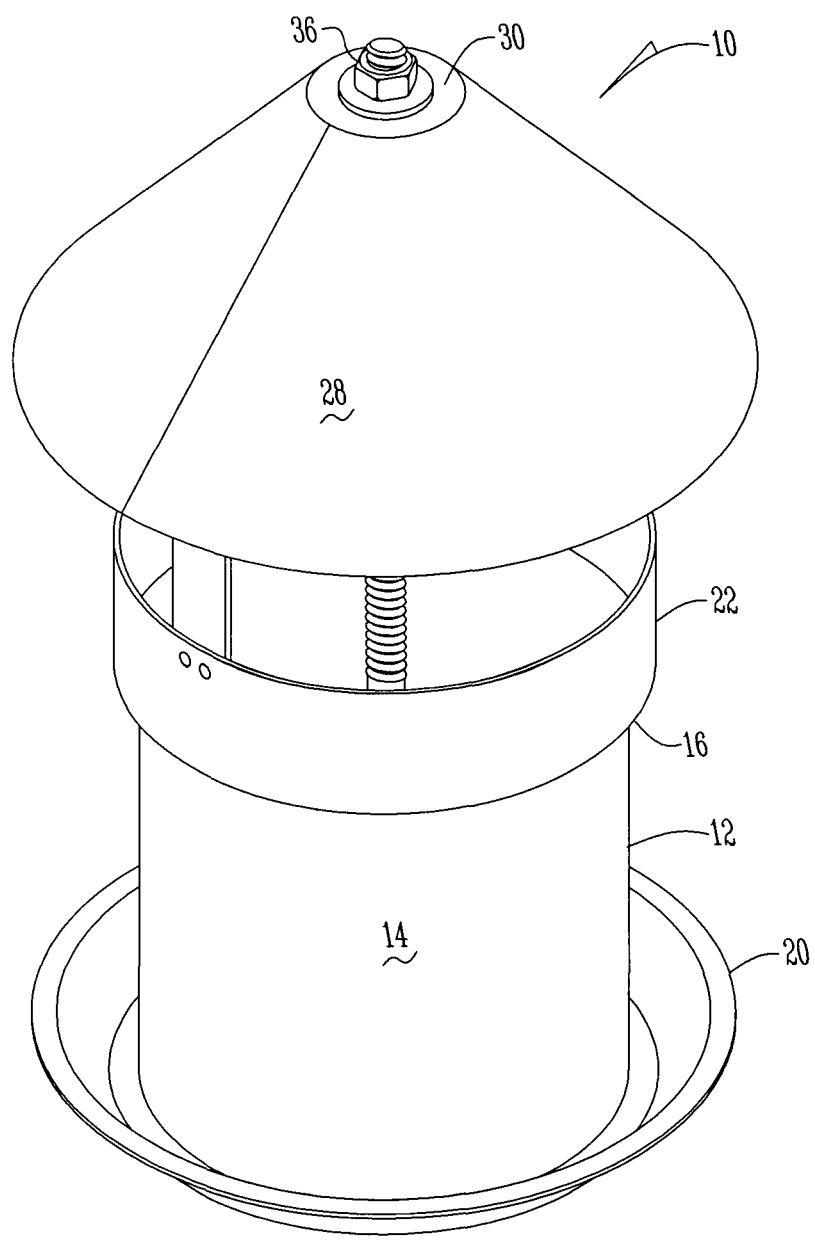
FIG. 2 is a perspective view of a cover assembly and drinker.
Figure 3:
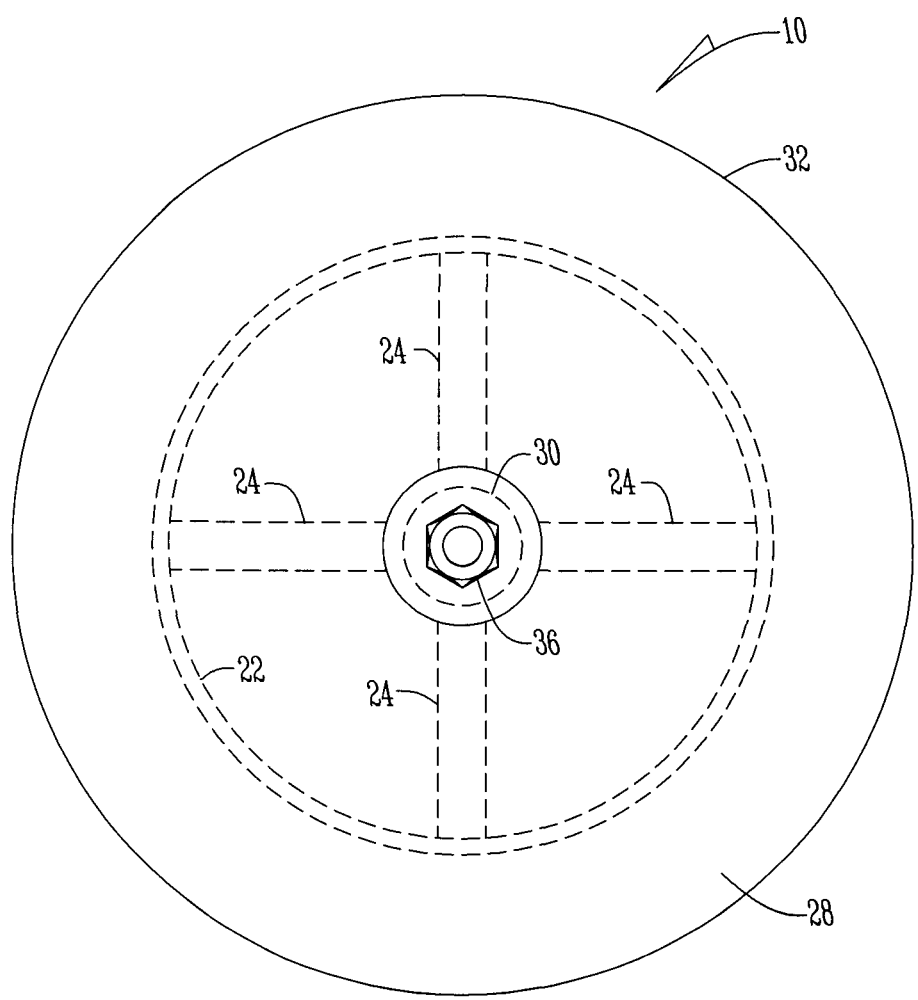
FIG. 3 is atop plan view of a cover assembly.

Referring to the Figures, the cover assembly 10 is used in relation to a poultry drinking or feeding device 12 and by example only will be described for use in relation to a poultry fount. Poultry founts 12 are of different types and design but generally have a tank 14 having a top 16 with a top edge 18, and connected to the bottom of the tank 14 is a drinking pan or trough 20 that receives water from the tank.

The cover assembly 10 has a sleeve 22 that is formed to fit snuggly around the top 16 of the tank 14. The sleeve 22 can be made to fit any size of drinker 12 or alternatively is adjustable. Connected to the sleeve 22 and extending generally radially inwardly above the top 16 of the tank 14 are a plurality of support members 24. The support members 24 are connected to a primary support member 26 that extends upwardly away from the tank in a generally vertical direction. Preferably, the primary support member is threaded.

A cover member 28 is pivotally or tiltably connected to the primary support member 26. Preferably, the cover member 28 has a central opening 30 having a diameter larger than the diameter of the primary support member 26 and either tapers downwardly from the central opening 30 to an outer edge 32. Alternatively, the cover 30 is arcuate and convex in relation to the tank 14. Preferably, the cover 30 is connected to the primary support member 26 by placing a first nut and washer 34 on the primary support member 26, inserting the primary support member 26 through the central opening 30 of the cover 28 and placing a second nut and washer 36 on the primary support member 26 above the cover 28. The nuts and washers 34 and 36 are spaced apart and have a diameter greater than the diameter of the central opening 30. The amount of pivot or tilt of the cover 28 in relation to the primary support member 26 is dependent upon the difference of their respective diameters and the spacing between nuts 34 and 36.

In operation once assembled, when a bird lands on the cover 28 to roost the cover will tilt or pivot downward toward the tank causing the bird to slide off. From experience, it typically only takes one try before a bird learns not to attempt to roost on the cover.

Thus, a cover assembly has been disclosed that, at the very least, meets all the stated objectives and keeps contamination off the handle so the device is cleaner for the individual filling the drinker.

What is claimed:

1. A cover and poultry drinker assembly, comprising; a sleeve directly engaging and completely encircling an outermost perimeter of a top edge of a drinker tank;
   a primary support connected to the sleeve that extends upwardly and away from the drinker tank,
   wherein the primary support is connected to the sleeve by a plurality of support members that extend radially from the primary support to the sleeve and above the top edge of the drinker tank; and
   a cover member pivotally connected to the primary support.

2. The assembly of claim 1 wherein the cover member tapers downwardly from a central opening to an outer edge.

3. The assembly of claim 1 wherein the cover member is arcuate and convex in relation to the drinker tank.

4. The assembly of claim 1 wherein the cover member is pivotally mounted by placing a first nut and washer on the primary support, inserting the primary support through a central opening on the cover member and placing a second nut and washer on the primary support.

5. The assembly of claim 1 wherein the sleeve is adjustable.

* * * * *